Nov. 17, 1959     H. J. BICHSEL ET AL     2,913,653
THYRATRON MOTOR CONTROL
Filed Oct. 14, 1957

United States Patent Office 2,913,653
Patented Nov. 17, 1959

2,913,653

THYRATRON MOTOR CONTROL

Harry J. Bichsel, East Aurora, and Floyd E. Adamson, Tonawanda, N.Y., assignors to Westinghouse Electric Corporation, East Pittsburgh, Pa., a corporation of Pennsylvania Application October 14, 1957, Serial No. 689,821

6 Claims. (Cl. 318—331)

This invention relates to electric discharge apparatus and has particular relation to motor control apparatus.

Apparatus in accordance with the teachings of the prior art is typified by Patent 2,823,331, granted February 11, 1958 to Harry J. Bichsel and Alfred J. Baeslack for arc welding apparatus. This application discloses a drive particularly for a consumable arc-welding electrode including a motor-control circuit with I-R drop compensation which has operated high satisfactorily. But this apparatus is costly including a current transformer from which a signal for I-R drop compensation is derived and other related components. Other apparatus of the prior art is likewise costly, complex or not entirely reliable.

It is accordingly broadly an object of this invention to provide a low cost drive including motor control apparatus with I-R drop compensation.

Another object of this invention is to provide such apparatus which shall operate reliably and in the operation of which the I-R drop compensation shall be effective.

The apparatus according to this invention includes an electric discharge device through the anode-cathode circuit of which the motor is energized. In accordance with this invention a time-constant network is connected to the motor supply circuit through a rectifier so that the network is charged to a potential dependent and preferably substantially proportional to the current conducted by the motor. This network is also connected as part of the control circuit of the discharge device. The control circuit is such that once the device becomes non-conducting the net potential across the rectifier opposes conduction through the rectifier. The rectifier is bypassed and the potential on the network is effective to determine the instant when the device is again rendered conducting.

The network is so connected in the control circuit that it increases the conductivity of the discharge device as the current conducted by the motor increases. The relationship between the increase in current conducted by the motor and the conductivity of the device is such that the I-R drop compensation is effected.

The novel features considered characteristic of this invention are disclosed generally above. The invention itself both as to its organization and as to its method of operation, together with additional objects and advantages thereof, will be understood from the following description of a specific embodiment when taken in connection with the accompanying drawing in which:

Fig. 2 is presented for the purpose of aiding those skilled in the art in practicing the invention and not with any intention of in any respect limiting the scope of this invention.

Figure 1:
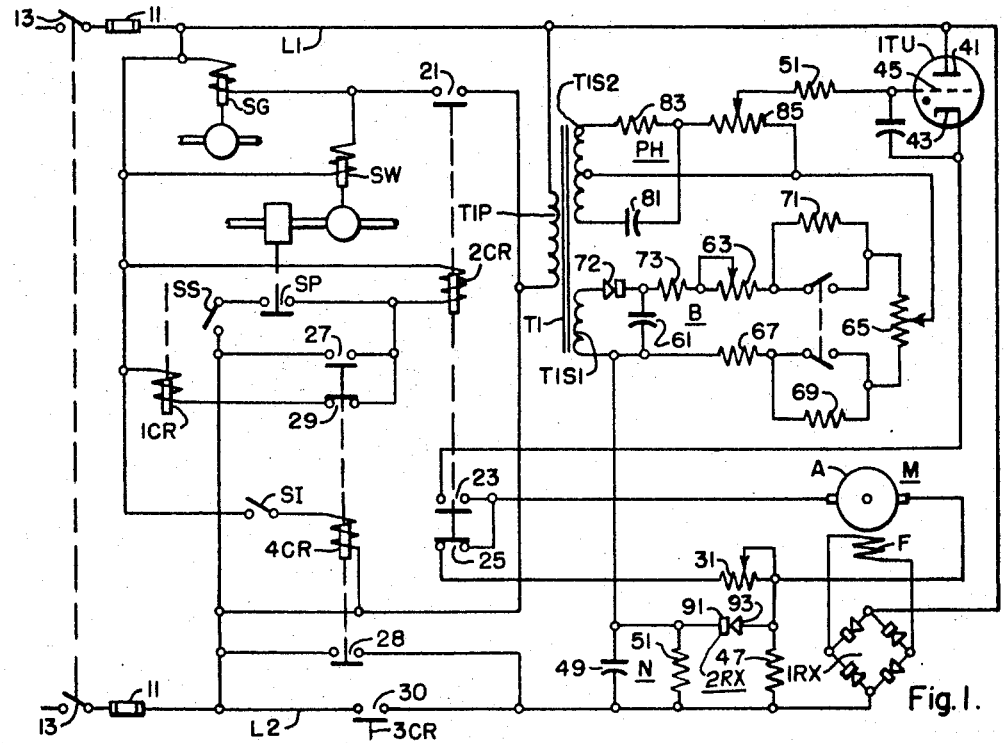
Figure 1 is a circuit diagram of a preferred embodiment of this invention.
Figure 2:
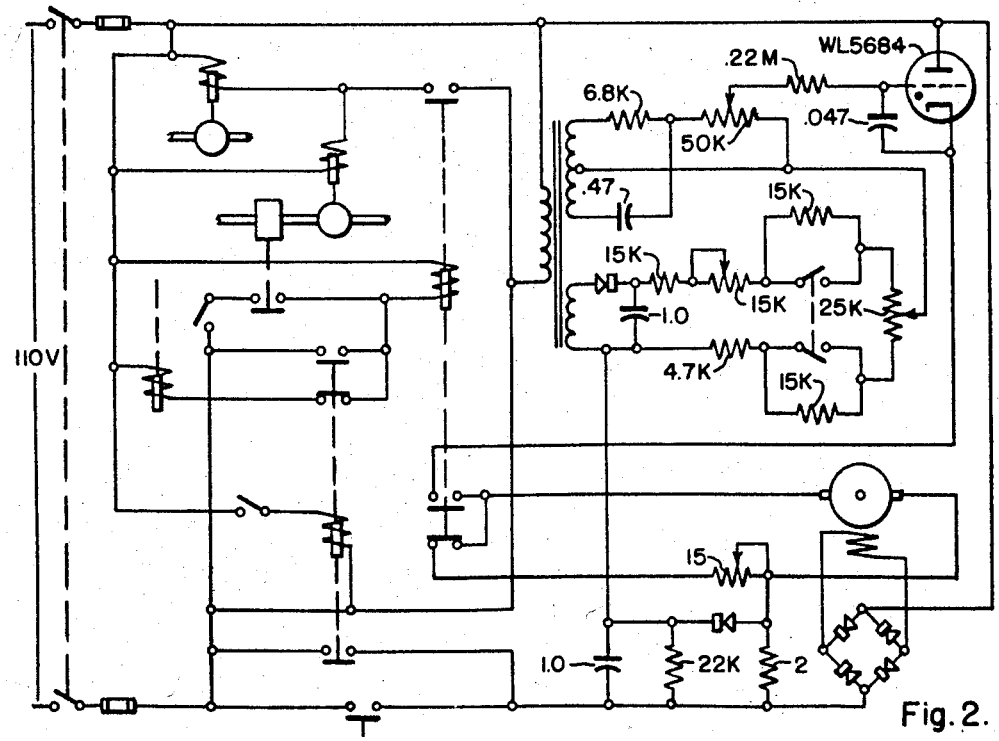
Fig. 2 is a diagram similar to Fig. 1 but showing the magnitudes of the components of a system which has been constructed and found to operate satisfactorily.

This invention is disclosed in Fig. 1 specifically as used in a gas-shielded, consumable-electrode, arc-welding system for driving the consumable electrode. Such a system is supplied from alternating current conductors L1 and L2 which are adapted to be connected to the conductors of a commercial supply through the usual fuses 11 and disconnects 13. The supply may be of the 110, 220 or 440-volt type but in the system shown in Fig. 2 is of the 110-volt type. The apparatus includes solenoids SW and SG for controlling the water and gas valves of the welding gun or torch through which the electrode is driven and in addition a plurality of relays 1CR, 2CR and 4CR. The relay 1CR is usually included as part of the welding arc power supply unit and has contacts (not shown) in the unit which provide for energizing the unit. The relay 2CR has a pair of normally open contacts 21 and 23 and a normally closed contact 25. The relay 4CR has normally open contacts 27 and 28 and a normally closed contact 29. In addition such apparatus usually includes a current relay 3CR (coil not shown) which is actuable by the current flowing through the welding arc and which has a normally open contact 30.

The coil of the relay 1CR is adapted to be connected between conductors L1 and L2 through a starting switch SS usually mounted in the gun or torch, a water-pressure switch SP which is closed when the water pressure is adequate for cooling the welding gun or torch and normally closed contact 29 of the relay 4CR. The coil of the relay 2CR is adapted to be connected between conductors L1 and L2 through the start switch SS and the water pressure switch SP. The coil of the relay 2CR is also adapted to be connected between conductors L1 and L2 through the normally open contact 27 of the relay 4CR. The gas and water solenoids SG and SW are adapted to be connected between conductors L1 and L2 through the normally open contact 21 of relay 2CR. The coil of relay 4CR is adapted to be connected between conductors L1 and L2 through an inching switch SI which is normally open.

The apparatus shown in the drawing also includes a motor M for driving the consumable arc-welding electrode having an armature A and a field winding F. While the motor M shown is of the shunt type, the invention is applicable to motors of other types. The armature A is shunted by a braking resistor 31 connected across the armature through the normally closed contact 25 of relay 2CR. The winding F of the motor is supplied from the conductors L1 and L2 through a full-wave rectifier 1RX.

For controlling the motor M, a discharge device 1TU, preferably a thyratron having an anode 41, a cathode 43 and a control electrode 45, is provided.

The armature A is adapted to be connected to be supplied from conductors L1 and L2 through normally open contacts 23 and 30 or 28 of relays 2CR, 3CR and 4CR respectively. The supply circuit includes the anode 41 and cathode 43 of thyratron 1TU, the armature A and a low resistor 47. The current conducted by the armature A is determined by the conductivity of the thyratron 1TU. The thyratron is so controlled as to compensate for the I-R drop across the armature.

For this purpose the apparatus includes a time-constant network N including a capacitor 49 shunted by a resistor 51 which is connected to be charged through a rectifier 2RX by the potential drop across the resistor 47 in the motor supply circuit. The rectifier 2RX is poled so as to conduct positive current from the upper terminal of resistor 47 to the upper terminal of network N. By positive current is meant the flow of positive ions or holes as distinct from electrons. The potential drop across the resistor 47 is dependent on the current conducted by the armature A and thus is substantially proportional to the I-R drop through the armature. The network N and the armature A are connected between the control electrode 45 and the cathode 43 of the thyratron in a circuit which is adapted to be closed by the normally open contacts 23 and 30 or 28 of relays 2CR, 3CR and 4CR respectively. This circuit includes in addition to armature A and network N, a bias network B, a network PH for supplying an alternating potential of relatively low magnitude, which is displaced in phase with reference to the anode-cathode potential, and a grid resistor 51.

The bias network B includes a capacitor 61 shunted by a pair of variable resistors 63 and 65 and a plurality of fixed resistors 67, 69, 71 and 73, one of which (71) may be shunted out when the apparatus is set for high speed and the other (69) when the apparatus is set for low speed. The capacitor 61 is connected to be charged through a rectifier 72 and a resistor 73 from the secondary T1S1 of a transformer T1, the primary T1P of which is connected between conductors L1 and L2. The rectifier 72 is so poled that the plate of the capacitor 61 electrically nearer the control electrode 45 is positive and the other plate negative.

The transformer T1 has another secondary T1S2 which has an intermediate tap and which supplies the phase-shift network PH. The network PH includes in addition to the secondary T1S2 a capacitor 81 and a resistor 83 connected in series. A variable resistor 85 is connected between the intermediate terminal and the junction of the capacitor 81 and the resistor 83. The magnitude of the alternating voltage derivable from the network PH is determined by setting the variable resistor.

In the stand-by condition of the apparatus, the disconnects 13 are closed and the conductors L1 and L2 are energized. The transformer T1 is then energized so that the bias network B, the filament of 1TU and the network PH are energized. The start switch SS and the inching switch SI are both open and relays 1CR, 2CR, 3CR and 4CR are deenergized as are also the solenoids SG and SW. The armature supply circuit and the control circuit of thyratron 1TU are then open and the motor M is deenergized.

In the use of the apparatus, when an electrode is to be supplied for welding, the start switch SS is closed, energizing relays 1CR and 2CR. Relay 1CR energizes the welding arc power supply unit of the welding apparatus (not shown). The actuation of relay 2CR causes the solenoids SG and SW to be energized and shielding gas and cooling water to be supplied to the torch (not shown). In addition, the normally closed contact 25 across the armature A is opened disconnecting the braking resistor, and the normally open contact 23 of the relay 2CR is closed. With the welding arc power supply unit energized, welding voltage is applied between the welding electrode and the work. The gun is then placed in a position such that the welding electrode touches the work firing an arc and energizing relay 3CR. Contact 30 now closes completing the armature and control circuits. The thyratron 1TU is now energized and current depending on the setting of the biasing network B and the phase-shift network PH is supplied to the armature A during alternate half periods of the potential available between conductors L1 and L2. Current flow through the thyratron usually persists for less than a half period due to control of the firing instant. Conduction begins after the A.C. anode voltage passes through the zero point and rises from anode negative to anode positive. When the motor is running at no load the thyratron fires after the 90° maximum point of positive anode voltage. The thyratron cutoff point (zero current) is determined by the inductance and speed of the armature, the load and other factors, and may or may not occur beyond the zero point where the impressed voltage changes from anode positive to anode negative.

The current flows through the resistor 47 in series with the armature A and the network N is charged through the rectifier 2RX to a potential dependent on a drop across the resistor 47. So long as this current flows, the thyratron 1TU is unaffected by the charge on network N, because once the thyratron 1TU is rendered conducting it is not affected by its control potential. When the thyratron becomes non-conducting, the polarity of the potential across rectifier 2RX is reversed and the network N becomes effective in the control circuit.

For an understanding of this phenomenon, it is desirable that the potentials in circuit with the rectifier 2RX just before 1TU becomes conducting during each period be considered. Before thyratron 1TU becomes conducting, an induced potential exists across the brushes of the armature A such that the terminal electrically nearer the cathode 43 is positive and the terminal electrically nearer the rectifier 2RX is negative. In addition, there is the potential of network B which is positive at its terminal electrically nearer the control electrode 45 and negative at its terminal electrically nearer the rectifier 2RX, and the potential of the network PH which at this time impresses a negative potential decreasing in absolute magnitude between the control electrode 45 and the cathode 43. The rectifier 2RX is an ordinary selenium rectifier having high forward conductivity. While thyratron 1TU was conducting during the preceding period, rectifier 2RX permitted N to charge to a potential dependent in the drop across resistor 47. Since the current flow through 47 is now zero, the potential across 2RX is such that the cathode 91 of 2RX is more positive than the anode 93, and 2RX may be regarded as an open circuit as far as N and 47 are concerned.

The control circuit of the thyratron 1TU then excludes the rectifier 2RX and extends from the cathode 43 through the armature A, the resistor 47 in series with the armature, the network N, the network B, the network PH, the grid resistor 51 to the control electrode 45. The potential which accumulated on network N during the preceding half period while thyratron 1TU was conducting is then impressed in the control circuit of thyratron 1TU and determines its conductivity. The network N is connected with its positively charged terminal electrically nearer the control electrode 45, and its negatively charged terminal electrically nearer the cathode 43. The effect of the network then is to increase the conductivity of thyratron 1TU as the potential across the network increases. Thus, the conductivity of the thyratron increases as the current conducted by the armature A increases, and with the control circuit properly adjusted I-R drop compensation is effected.

While the apparatus disclosed herein is of relatively simple structure and of low cost, it operates reliably. The impedances of the control circuit included in the apparatus may be conveniently mounted on a printed circuit and in this way the cost of the apparatus may be further reduced.

While a preferred embodiment of this invention has been disclosed herein, many modifications thereof are feasible. The invention therefore is not to be restricted except insofar as it is necessitated by the spirit of prior art.

We claim as our invention:

1. Drive apparatus including a motor, means for supplying alternating potential including a first terminal and a second terminal, an electric discharge device having an anode, a cathode and a control electrode, rectifier means, a time constant network, resistor means, means connecting in series to supply current to said motor through said anode and cathode, said terminals, said anode, said cathode, said motor and said resistor means, with said motor electrically between said cathode and said resistor means, and said resistor means electrically between said motor and said second terminal, means including said rectifier means connecting said network across said resistor means, said rectifier means being electrically connected to the junction of said resistor means and said motor and being poled to conduct positive current from said motor to said network, and means connecting in series circuit excluding said rectifier means, said control electrode, said network and said second terminal, whereby the supply of current to said motor through said anode and cathode is controlled in dependence upon said network, said network introducing compensation for the I-R drop across said motor.

2. Drive apparatus including a motor, an electric discharge device having an anode, a cathode and a control electrode, means for supplying an alternating potential, rectifier means, a time-constant network, first means including said supplying means and said anode and cathode and connected to said motor for supplying energizing current to said motor through said anode and cathode, second means including said supplying means, said anode and cathode, said motor and said rectifier means connected to said network for charging said network to a potential dependent on the current conducted by said motor, said second means effecting said charging only by electrical conduction as distinct from induction, and means connecting in a series circuit, excluding said rectifier means, between said control electrode and said cathode said motor and said network, with the induced potential of said motor poled with respect to said control electrode and cathode so that it tends to render said device non-conducting and the charge on said network poled with respect to said control electrode and cathode so that its potential counteracts said induced potential, whereby the conduction between said anode and cathode is controlled in dependence upon said network, said network introducing compensation for the I-R drop across said motor.

3. An I-R drop compensation circuit for a motor supplied from an alternating current supply through a gaseous electric discharge device having an anode, a cathode and a control electrode, comprising a time-constant network, means including asymmetrically conducting means in addition to said device connected to said motor for charging said network to a potential substantially proportional to the current conducted by said motor, said last-named means effecting said charging only by electrical conduction as distinct from induction, and means bypassing said asymmetrically conducting means connecting said network and said motor between said control electrode and cathode so as to control the conductivity between said anode and cathode, the charge on said network being so poled with respect to said control electrode and cathode when said network is connected by said last-named connecting means as to increase said conductivity as the current conducted by said motor increases.

4. Drive apparatus including a motor, an electric discharge device having an anode, a cathode and a control electrode, means for supplying an alternating potential, rectifier means, a time-constant network, means including said supplying means and said anode and cathode and connected to said motor for supplying energizing current therethrough, means including said supplying means, said anode and cathode, said motor and said rectifier means connected to said network for charging said network to a potential dependent on the current conducted by said motor, means connected to said supplying means for producing a ripple potential of the same frequency for producing a ripple potential of the same phase relative to said alternating potential, and means connecting in a series circuit, excluding said rectifier means, between said control electrode and said cathode said motor, said ripple potential, and said network, with the induced potential of said motor poled with respect to said control electrode and cathode so that it tends to render said device non-conducting and the charge on said network poled with respect to said control electrode and cathode so that the potential produced by said charge counteracts said induced potential and the algebraic sum of said ripple potential and said network potential determining the conductivity of said device in accordance with the magnitude of said network potential.

5. Drive apparatus including a motor, means for supplying an alternating potential, an electric discharge device having an anode, a cathode and a control electrode, a time-constant network, rectifier means, first means connecting said motor in an energizing circuit with said supplying means and said anode and cathode, second means including said rectifier means connected to said energizing circuit and said network for charging said network to a potential substantially proportional to the current conducted by said motor, said second means effecting said charging only by electrical conduction as distinct from induction, and means, excluding said rectifier means, connecting said network when so charged between said control electrode and said cathode to control the conductivity of said device in accordance with the potential to which said network is charged, said charge on said network being so poled with respect to said anode and cathode that the conductivity of said device increases with the increase in current conducted by said motor, whereby said network introduces compensation for the I-R drop across said motor.

6. In combination an electric discharge device of the gaseous type having an anode, a cathode and a control electrode, means for supplying an alternating potential, rectifier means, a time-constant network, symmetrically conducting impedance means, means connecting said supplying means in circuit with said anode and cathode and said impedance means to impress a potential between said anode and cathode and to produce current flow through said anode and cathode and said impedance means, means connecting said rectifier means and said network in shunt with said impedance means with said rectifier means poled so that said network is charged by the flow of positive current from said cathode to said network, and means connecting between said control electrode and said cathode said impedance means and said network, said last-named connecting means including means for impressing a potential across said rectifier means which cooperatively with the potential on said network blocks the conductivity of said rectifier means during the intervals when said device is non-conducting.

References Cited in the file of this patent

UNITED STATES PATENTS

| | | |
|---|---|---|
| 2,516,568 | Haneiko | July 25, 1950 |
| 2,753,506 | Elliot | July 3, 1956 |
| 2,823,331 | Bichsel et al. | Feb. 11, 1958 |